United States Patent [19]

Pepe

[11] Patent Number: 5,388,659
[45] Date of Patent: Feb. 14, 1995

[54] MOTORIZED SCOOTER

[76] Inventor: Anthony Pepe, 207 E. 85th St., New York, N.Y. 10028

[21] Appl. No.: 109,362

[22] Filed: Aug. 19, 1993

[51] Int. Cl.6 .................. B62K 11/06; B62K 11/10; B62K 15/00; B62M 7/08
[52] U.S. Cl. .................................. 180/219; 180/231; 180/208
[58] Field of Search ............... 180/219, 222, 223, 230, 180/231, 208, 180, 181; 280/47.315, 47.371, 655, 655.1, 87.041; 403/108, 109, DIG. 6, 319, 321

[56] References Cited

U.S. PATENT DOCUMENTS

| | | | |
|---|---|---|---|
| 2,111,691 | 3/1938 | Salsbury | 180/208 X |
| 2,237,677 | 4/1941 | Lewis | 180/219 |
| 2,429,153 | 10/1947 | Ammon et al. | 180/219 X |
| 2,445,058 | 7/1948 | Fields | 180/219 X |
| 2,476,059 | 7/1949 | Mertz | 180/231 X |
| 2,493,287 | 1/1950 | Hatfield | 180/231 |
| 2,749,997 | 6/1956 | Deslippe | 180/208 |
| 3,369,629 | 2/1968 | Weiss | 180/208 |
| 3,417,834 | 12/1968 | Smith | 180/208 |
| 3,572,757 | 3/1971 | Camps | 180/208 |
| 4,026,573 | 5/1977 | Richardson | 280/278 |
| 4,076,270 | 2/1978 | Winchell | 180/220 |
| 4,094,374 | 6/1978 | Adams | 180/208 |
| 4,570,739 | 2/1986 | Kramer | 180/208 X |
| 4,697,664 | 10/1987 | Kohyama | 180/226 |
| 4,708,219 | 11/1987 | Cresswell | 180/208 X |
| 4,821,832 | 4/1989 | Patmont | 180/208 |
| 4,830,133 | 5/1989 | Gaddi | 180/208 |
| 4,842,091 | 1/1989 | Badsey | 180/219 |
| 4,923,026 | 5/1990 | Shimoyama et al. | 180/215 |
| 4,944,359 | 7/1990 | Doman et al. | 180/208 |
| 4,947,955 | 8/1990 | Hopely, Jr. | 180/216 |
| 5,036,938 | 8/1991 | Blount et al. | 180/208 |

Primary Examiner—Margaret A. Focarino
Assistant Examiner—F. Zeender
Attorney, Agent, or Firm—Lackenbach Siegel Marzullo Aronson and Greenspan

[57] ABSTRACT

A motorized scooter comprises a generally tubular frame, a deck mounted on the frame having a generally planar unencumbered rider support portion adapted to carry a rider standing upon the deck, a front steerable wheel, a steering member rotatably secured to a front end of the frame and to an axle of the front wheel, a rear driven wheel having an axle rotatably supported by a rear portion of the frame, a motor mounted forward of the rear wheel on the rear portion of the frame, and a drive transfer device connecting the motor to the rear wheel. The motor has a drive shaft which extends from the motor parallel to and in front of the rear wheel. The free end of the drive shaft is located on one side of and forward of the rear wheel. The drive transfer device couples the drive shaft to the rear axle on the opposite side of the rear wheel. The transfer device is preferably an arrangement of chains and sprockets which extends from the one end of the drive shaft on one side of and forward of the rear wheel up and over the rear wheel to an opposite side of the rear wheel where it descends and connects to the rear axle.

A second feature of the invention is a unique folding steering member which latches into a recess preferably in the center of the rear portion of the deck. The steering member thus becomes a carrying handle for the motor scooter.

16 Claims, 6 Drawing Sheets

MOTORIZED SCOOTER

BACKGROUND OF THE INVENTION

1. Field of the Invention

This invention generally relates to two wheeled vehicles and more particularly to a portable motor scooter operated by a rider in a standing position.

2. Description of the Related Art

Various portable motorized vehicles have been proposed which can be broken down for transport in an automobile trunk. Motorized wheelchairs are one such example. These vehicles are typically disassembled into two separate parts. Typical designs are disclosed in U.S. Pat. Nos. 4,570,739; 4,708,219; 4,944,359; 4,947,955; and 5,036,938.

Recreational vehicles are often desired which are compact and lightweight. Therefore motorcycles and motorscooters have also been designed to be folded for storage in an automobile trunk for transport to and from a desired location where the vehicle is unfolded and ridden. Examples of such foldable two wheeled vehicles are set forth in U.S. Pat. Nos. 4,026,573; 4,076,270; 4,094,374; 4,830,133; and 4,923,026.

In the search for a more compact two wheeled vehicle which is motorized, the basic child's scooter, which is generally ridden by standing on a platform with one foot and pushing it forward with the other foot, has been modified and motorized. One such motorized scooter is disclosed in U.S. Pat. No. 4,821,832 issued to Patmont. This scooter has a tubular frame and a foldable front steering fork mounted to the front wheel and a motor mounted behind the foot platform which drives the rear wheel. The front fork has a T-shaped handlebar mounted to the fork's upper end. The stem of the T-shaped handlebar folds back by pivoting at a point just above the headset of the front strut. The handlebar can be locked in the rearwardly folded position to act as a carrying handle.

Another foldable scooter is disclosed in U.S. Pat. No. 4,842,091. This patent disclosed a scooter having the motor and the rear wheel mounted beneath the standing platform. The front fork also has a foldable T-shaped handlebar arrangement. One disadvantage of this scooter design is that this scooter has a relatively high center of gravity since the rider must stand over the rear wheel.

SUMMARY OF THE INVENTION

The motorized vehicle in accordance with the present invention is a motorized scooter. The scooter comprises a generally tubular frame, a deck mounted on the frame having a generally planar unencumbered rider support portion adapted to carry a rider standing upon the deck, a front steerable wheel, a steering member rotatably secured to a front end of the frame and to an axle of the front wheel, a rear driven wheel having an axle rotatably supported by a rear portion of the frame, a motor mounted forward of the rear wheel on the rear portion of the frame, and a drive transfer device connecting the motor to the rear wheel.

One feature of the present invention is a unique drive transfer device. The motor has a drive shaft which extends from the motor parallel to and in front of the rear wheel. The free end of the drive shaft is located on one side of a central axis between the front and rear wheels forward of the rear wheel. The drive transfer device couples the drive shaft to the rear axle on the opposite side of the rear wheel. The transfer device is preferably an arrangement of chains and sprockets which extends from the one end of the drive shaft on one side of and forward of the rear wheel up and over the rear wheel to an opposite side of the rear wheel where it descends and connects to the rear axle. This permits a rider platform portion of the deck to be positioned in front of the motor on a horizontal plane between the axles, with the motor taking up only minimal space in front of the rear wheel.

A second feature of the invention is a unique folding steering member which latches into a recess preferably in the center of the rear portion of the deck. The steering member thus becomes a carrying handle for the motor scooter. The steering member includes a tubular shaft portion which has one end pivotally attached at a joint to one end of a stem portion which fastens into the hollow stem of the front fork. A locking sleeve slides downward over the pivot joint to lock the shaft portion in the straight position for motor scooter operation and can be slid up off of the joint to permit folding of the steering member.

These and other features, advantages, and objects of the invention will become more apparent from a reading of the following detailed description when taken in conjunction with the accompanying drawing.

DETAILED DESCRIPTION OF THE INVENTION

Figure 1:
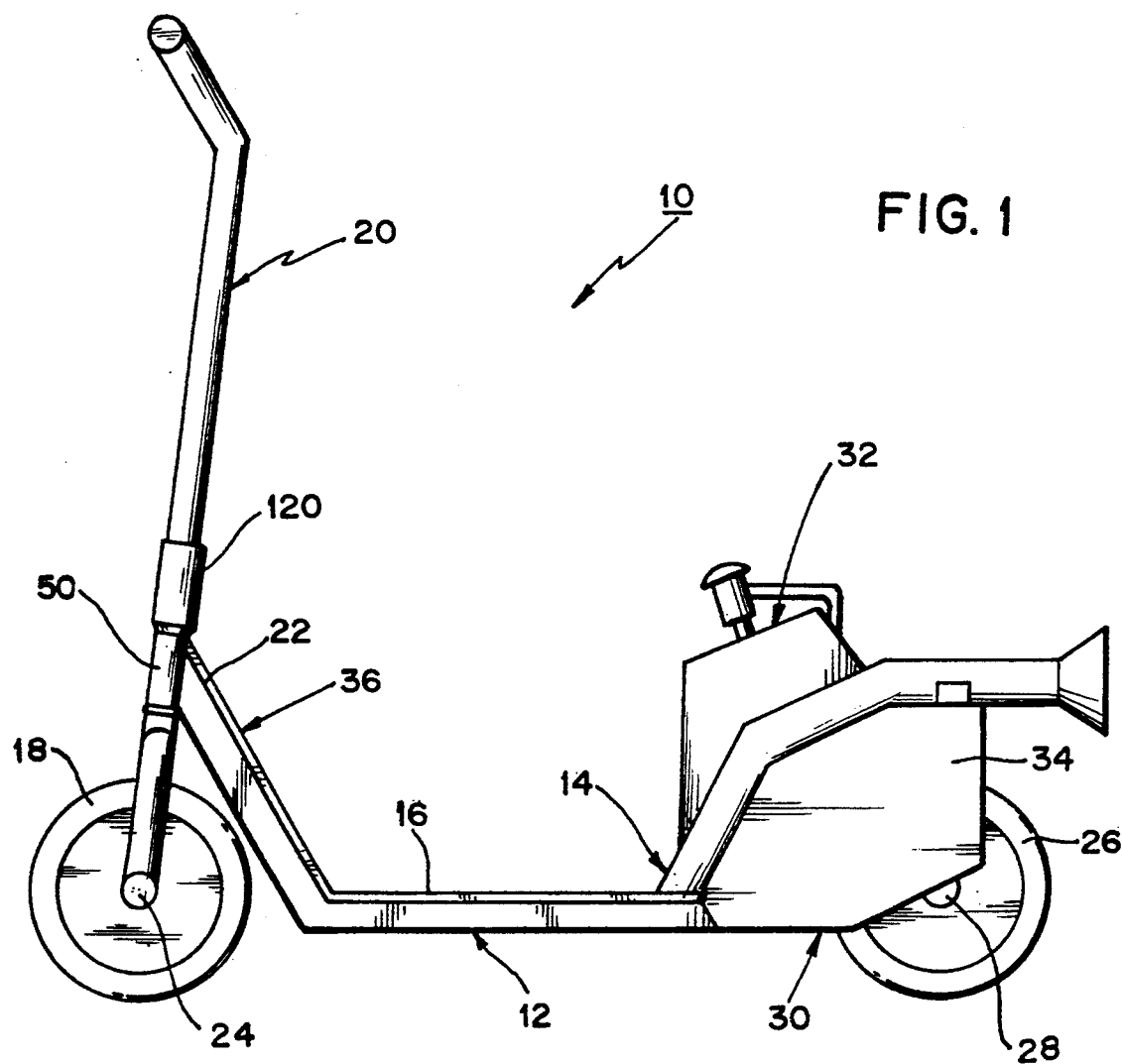
FIG. 1 is a side view of the motorized scooter in accordance with the invention.

A side view of the motorized scooter in accordance with the invention with the steering member in the upright operating position is shown in FIG. 1. The scooter 10 comprises a frame 12, a deck 14 mounted on the frame 12 having a generally planar unencumbered rider support portion 16 adapted to carry a rider standing upon the deck 14, a front steerable wheel 18, a steering member 20 rotatably secured to a front end 22 of the frame 12 and to an axle 24 through the front wheel 18, a rear driven wheel 26 having an axle 28 therethrough rotatably supported by a rear portion 30 of the frame 12, a motor 32 mounted forward of the rear wheel 26 on the rear portion 30 of the frame 12, and a unique drive transfer device 33.

The rotation of the front and rear wheels 18 and 26 is stopped efficiently by actuation of disc brake assemblies 19 and 27. These disc brakes are hand actuated from handlebar mounted brake levers. The disc-brake assemblies are very similar to motorcycle type disc brakes and are much more efficient at stopping the scooter than are conventional drum brakes. The disc brake calipers are connected to the brake levers via conventional cables (not shown).

Figure 2:
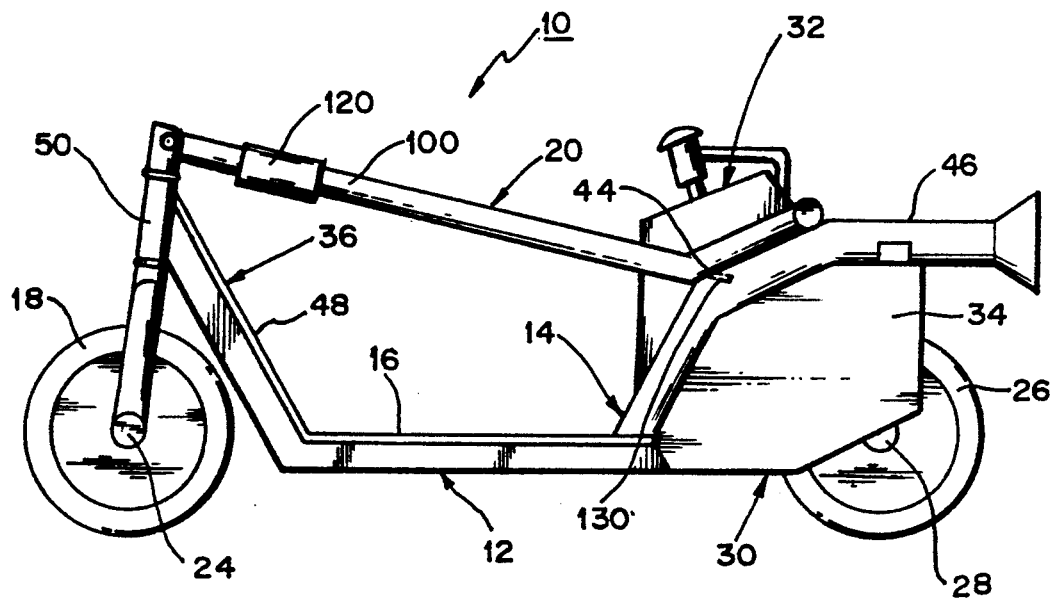
FIG. 2 is a side view as shown in FIG. 1 with the steering member folded for storage and transport.
Figure 3:
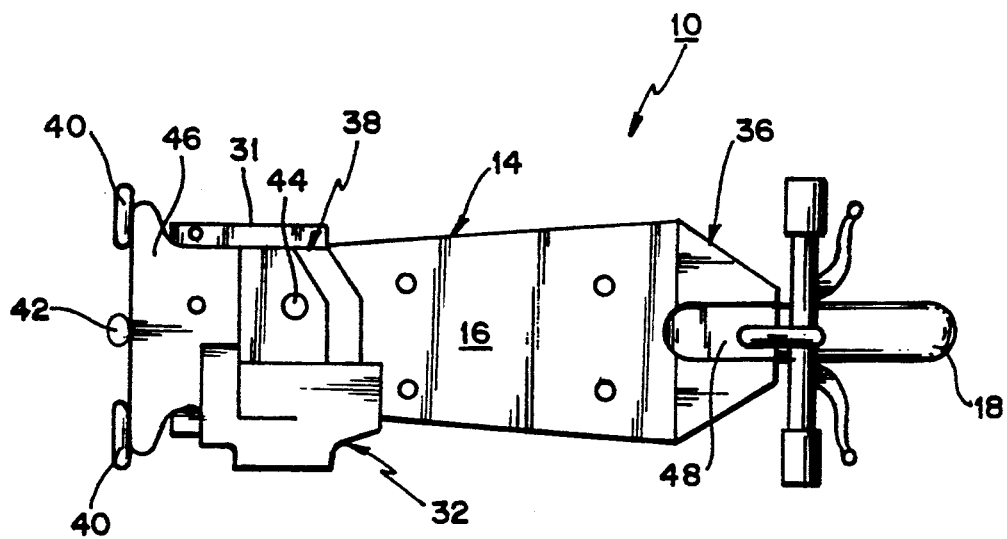
FIG. 3 is a top view of the motorized scooter shown in FIG. 1.

The motor 32 is mounted so that it sits partially on the fight side of the rear portion 30 of the frame 12 as is shown in FIG. 3. A fuel tank 34 is mounted to the frame 12 on the left side of the wheel 26, opposite the motor 32 as shown in FIGS. 1 through 3. The motor 32 is preferably a two or four cycle gasoline engine and may have either a manual rope type starter or a small battery and an electric starter. The manual starter is preferred to minimize weight of the vehicle.

The deck 14 is a one piece molded fiberglass body which has a flat, planar rider support portion 16, a tapered, slanted upward front portion 36, and a rear portion 38 which slants upward from the support portion 16 and generally horizontally rearward over part of the motor 32 and the rear wheel 26. The deck 14 is secured to the frame 12 with four bolts through the support portion 16, one bolt through the rear portion 38, and two bolts through the front portion on either side of the front end 22 of the frame 12.

The rear portion 38 of the deck 14 terminates in a rear skirt which extends downward over the top of the rear wheel 26 and supports turn signals 40 and a stop light 42. The rear portion 38 of the deck 14 also has a central aperture 44 which receives a retractable locking pin 130 which extends from the steering member 20 to lock the steering member 20 in the storage and transport position shown in FIG. 2. The rear portion 38 has left, rear and fight generally vertical sides and a generally flat top 46. The flat top 46 is bolted to the frame 12. The generally vertical sides of the rear portion 38 make the rear portion 38 of the deck 14 very strong and rigid. The front portion 36 of the deck 14 has a "U" shaped channel which receives the front portion of the frame 12. This channel 48 similarly provides rigidity and strength to the deck 14.

Figure 4:
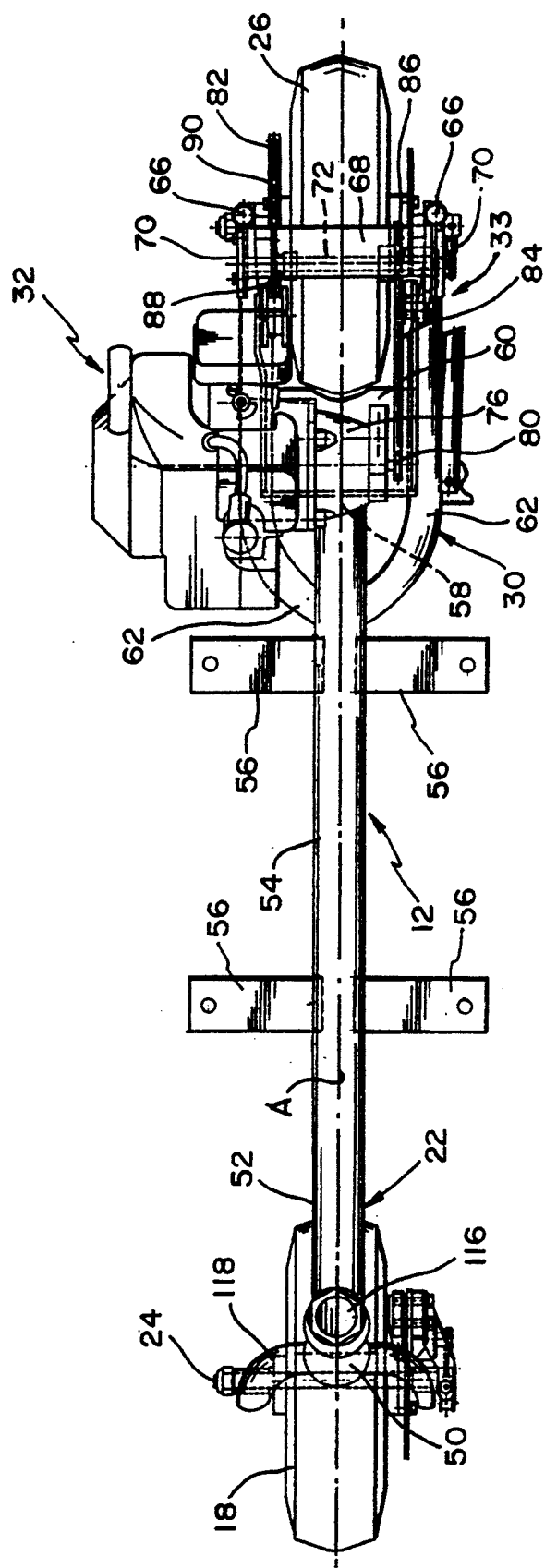
FIG. 4 is a top view of the motorized scooter shown in FIG. 1 with the handlebar, fuel tank and deck removed.
Figure 5:
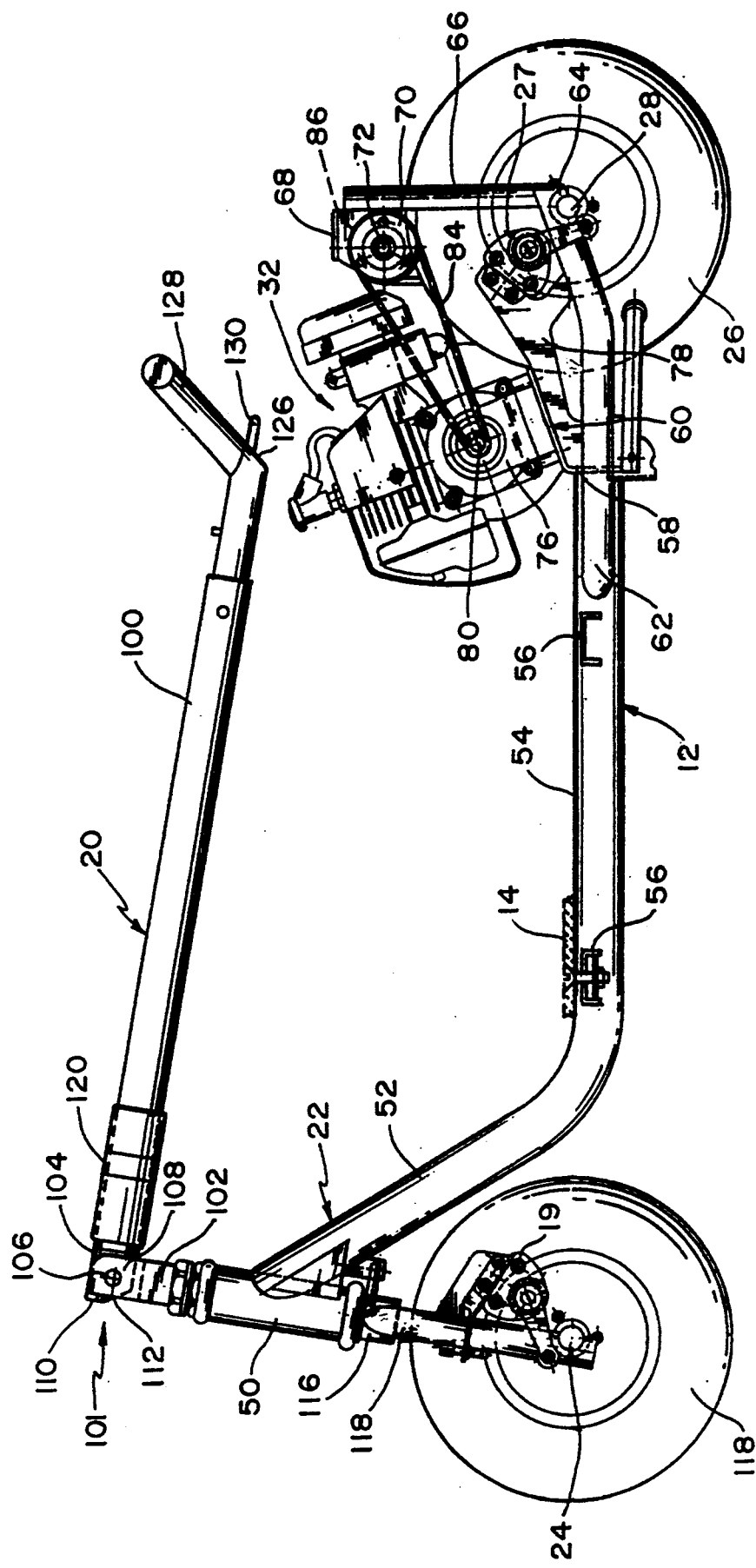
FIG. 5 is a left side view of the motorized scooter with the steering member in the folded position as is shown in FIG. 2 with the handlebar, and fuel tank removed.

The frame 12 is best shown in the FIGS. 4 and 5 which are top and side views of the scooter 10 respectively. Note that the deck 14 and the fuel tank 34 have been removed in FIGS. 4 and 5 for clarity of the underlying structure. The front end 22 of the frame 12 comprises a head tube 50 and a downwardly slanted tubular portion 52. The slanted portion 52 of the front end 22 curves into a central portion 54 which generally extends horizontally along a central axis "A" between the front and rear axles 24 and 28 respectively. The tubular central portion 54 has two pairs of opposing horizontal deck support plates 56 which extend orthogonally to the central axis A. The support plates are each welded at one end to the upper portion of the central portion 54 so as to form cantilevered supports for the deck 14. The deck 14 is in turn bolted to the support plates 56. The central portion 54 merges into the rear portion 30. The rear portion 30 includes the rear end of the tubular center portion 54 which abuts and is preferably welded to a vertical front face 58 of an engine mounting plate 60. A pair of rear fork legs 62 extend horizontally outward and rearward from opposite sides of the tubular central portion 54 at a location spaced forward of the mounting plate 60. This location provides a rigid base support for the rear fork legs. The rear fork legs 62 extend rearward, parallel to each other and equally spaced from the central axis A. The rear fork legs 62 each terminate in a journaled support 64 for the rear axle 28. A vertical strut member 66 is welded to each of the axle supports 64. This tubular strut member supports a horizontal drive transfer support plate 68 positioned over the rear wheel 26.

The horizontal drive transfer support plate 68 has downwardly bent ends which house a pair of bearings 70 which rotatably support a drive transfer shaft 72 which will be subsequently described in more detail. Each of the ends of the drive transfer support plate 68 is welded to the upper end of one of the tubular strut members 66 thus, in combination, providing a rigid inverted cradle for the driven rear wheel 26 between the rear fork legs 62.

The engine mounting plate 60 has a flat top portion 74 to which is bolted the clutch housing 76 of the motor 32. The clutch housing 76 in turn supports the motor 32. Conventional clutch housings have no support function. Clutch housing 76 has been modified to entirely support the motor 32 from the top portion 74 of the mounting plate 60. This arrangement permits the motor to be efficiently mounted forward of and to one side of the rear wheel 26. The clutch housing 76 encloses an automatic clutch asssembly which transfers torque from the crankshaft to the drive shaft in proportion to the RPM of the motor 32. Thus with the motor at an idle, no torque is applied to the drive shaft. As motor speed is increased, progressively greater torque is transferred to the drive shaft to accelerate the scooter, until, at a predetermined RPM, full torque is transferred to the drive shaft. The mounting plate 60 is transversely positioned between the rear fork legs 62 and is welded to vertical support plates 78 which are in turn welded to the tops of the fork legs 62. The combination of the mounting plate 60, the rear end of the central portion 54 of the frame 12, and the vertical support plates 78, all welded together results in a very rigid arrangement of the rear portion 30 of the frame 12 supporting the motor 32 via clutch housing 76.

The combination of the upright support struts 66 welded to the axle supports 64 at the ends of the fork legs 62 and to the ends of the horizontal drive transfer support plate 68 also provide a rigid support structure to the rear portion 30 for the rear wheel 26 and the drive transfer device 33. The frame 12 is preferably made of tubular and plate steel but could also be made of high strength aluminum or other light metal to minimize weight.

Figure 8:
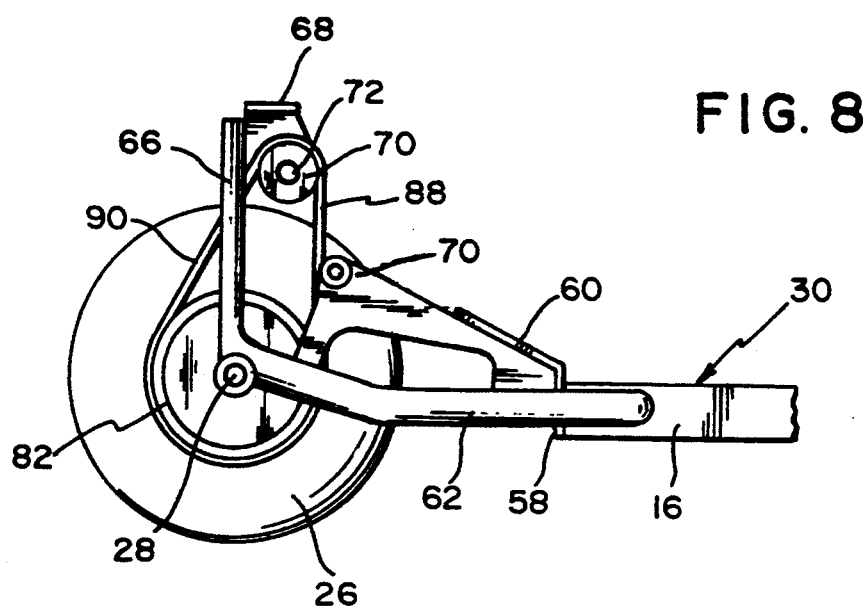
FIG. 8 is a partial right side view of the rear portion of the scooter in accordance with the invention with the engine and deck removed for clarity.

The unique drive transfer device 33 will now be described with reference to FIGS. 4, 5, and 8. The drive transfer device 33 includes a combination of sprockets and chain linkages from the sprocketed free end 80 of the drive shaft of the motor 32 on the left side of and in front of the rear wheel 26 which pass up and over the rear wheel 26 and down to the right side of the rear wheel 26. The drive shaft of the motor 32 extends horizontally from the clutch housing 76 mounted to the top 74 of the engine mounting plate 60 directly in front of the rear wheel 26. The sprocketed drive shaft free end 80 is located on the left side of the central axis A between the front and rear wheels forward of the rear wheel 26 and is coupled to a final drive sprocket 82 on the opposite side of the rear wheel 26. A primary chain 84 extends from the sprocketed end 80 rearwardly and upwardly to a primary transfer sprocket 86 mounted on the left end of the drive transfer shaft 72. A secondary transfer sprocket 88 is mounted on the other end of the drive transfer sprocket 72. A final drive chain 90 extends between the secondary transfer sprocket 88 down to the final drive sprocket 82 fixed to the rear wheel 26. This arrangement of four sprockets permits wide selection and simple changing of sprocket ratios to tailor engine speed and vehicle top speed to different operating conditions. In addition, the drive transfer device of the invention provides a simple, compact and efficient means of power transfer from the motor to the rear wheel 26.

Figure 6:
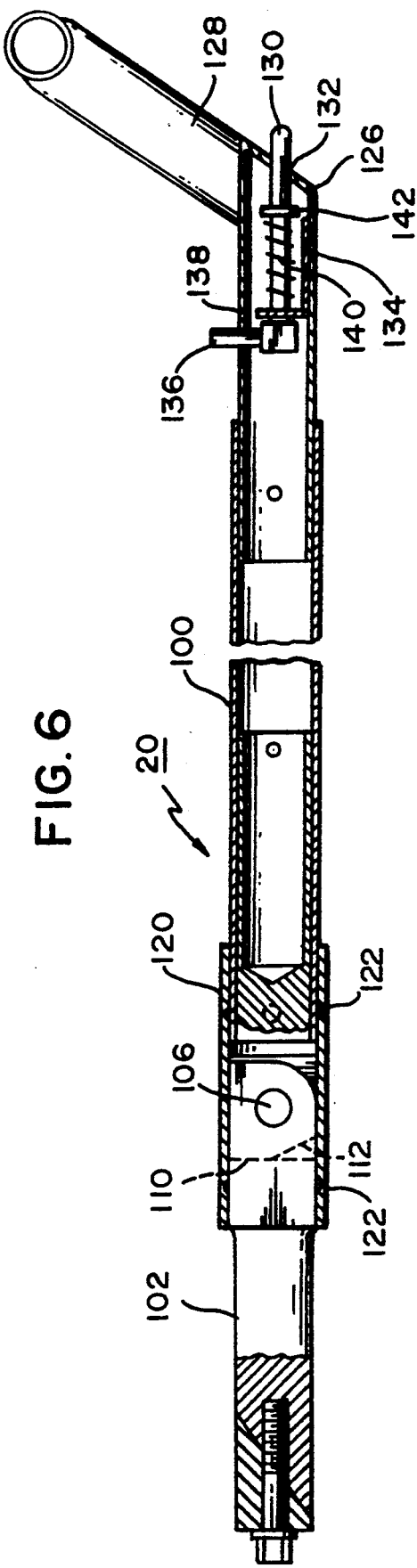
FIG. 6 is a sectional view of the steering member in accordance with the invention.
Figure 7:
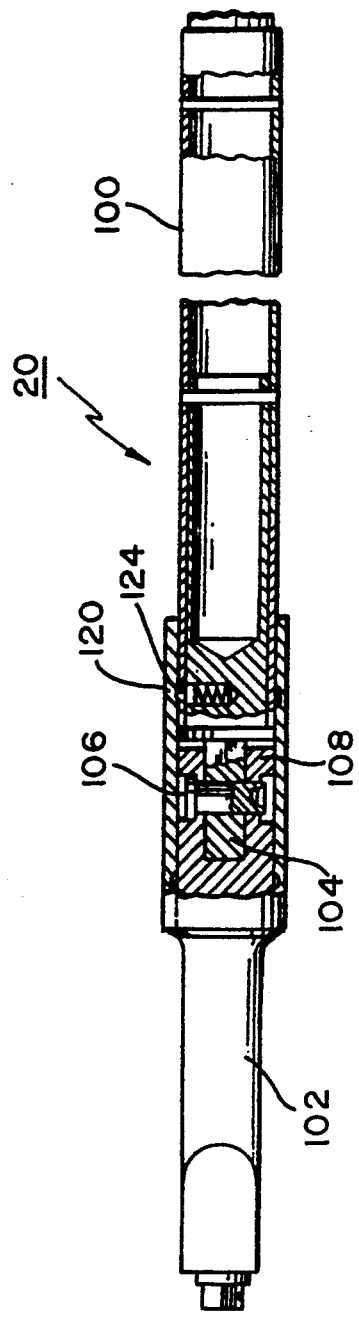
FIG. 7 is a sectional view of the steering member shown in FIG. 6 rotated 90 degrees.

A second feature of the invention is a unique folding steering member 20 which latches into a recess in the rear portion 38 of the deck 14 so as to become a carrying handle for the motor scooter 10. A sectional view of the steering member 20 is shown in FIGS. 6 and 7. Note that the conventional handlebar has been removed for clarity of the steering member structure. The steering member 20 includes a tubular shaft portion 100 foldably joined at a joint 101 to a stem portion 102. The joint 101 comprises one end 104 of the shaft portion 100 rotatably attached to a transverse pin 106 which is secured through a yoke 108 at one end of the stem portion 102. The one end 104 thus is sandwiched in the yoke 108 and is free to rotate about the pin 106. However, the shaft portion 100 is stopped from forward rotation by an interference between a fiat end surface 110 of the end 104 and the bottom of the yoke 108. A slanted end surface 112 of the end portion 104 permits the shaft portion 100 to rotate rearwardly to fold the steering member 20.

The other end 114 of the stem portion 102 slides within and is secured to the stem 116 of the front fork 118 which supports the axle 24. The stem 116 of the front fork 118 is journaled within the head tube 50 in a manner well known in the art.

A tubular collar 120 slides over the joint 101 to lock the stem and shaft portions 100 and 102 in the straight position for motor scooter operation. This collar 120 can be slid up off of the joint to permit folding of the steering member 20. The collar 120 has an internal circumferential groove 122 adjacent each end of the collar 120. The shaft portion 102 has a spring loaded ball 124 mounted in a blind bore at a location opposite the upper one of the grooves 122 when the collar 120 is fully lowered over the joint 101 and butted against the head tube 50. Engagement of the spring loaded ball 124 with the groove 122 prevents inadvertent movement of the collar off of the joint 101. The other groove 122 is positioned to engage the spring loaded ball 124 when the collar is raised sufficiently to permit folding of the shaft portion 100. The steering member 20 is shown in the operating position, with the collar 120 fully lowered, in FIGS. 6 and 7.

At the other end of the shaft portion 100 is a closed end 126 and an extension 128. The extension 128 is a tubular member welded at an angle to the end 126 of the shaft portion 100 and supports the handlebar (not shown in FIG. 6). The locking pin 130 extends axially through an aperture 132 in the closed end. The locking pin 130 is an elongated rod which is slidably supported in a bracket 134 bolted within the shaft portion 100 adjacent the closed end 126. An actuating handle 136 fastened to the locking pin 130 extends radially outward through an elongated slot 138 in the shaft portion 100.

The locking pin 130 is spring biased in the extended position by a coil spring 140 mounted between one end of the bracket 134 and a washer 142 pinned or otherwise fixed to the locking pin 130.

The steering member 20 is folded from the operating position shown in FIG. 1 and latched in the transport position shown in FIG. 2 by first raising the collar 120 until the spring loaded ball 124 engages the lower groove 122, folding the shaft portion rearward, retracting the locking pin manually and releasing it into the aperture 44 in the rear portion 38 of the deck 14. Since the rear portion 38 is bolted to the frame 12, specifically, the horizontal drive transfer support plate 68, the shaft portion 20 becomes a securely anchored carrying handle for the entire motor scooter 10.

Figure 9:
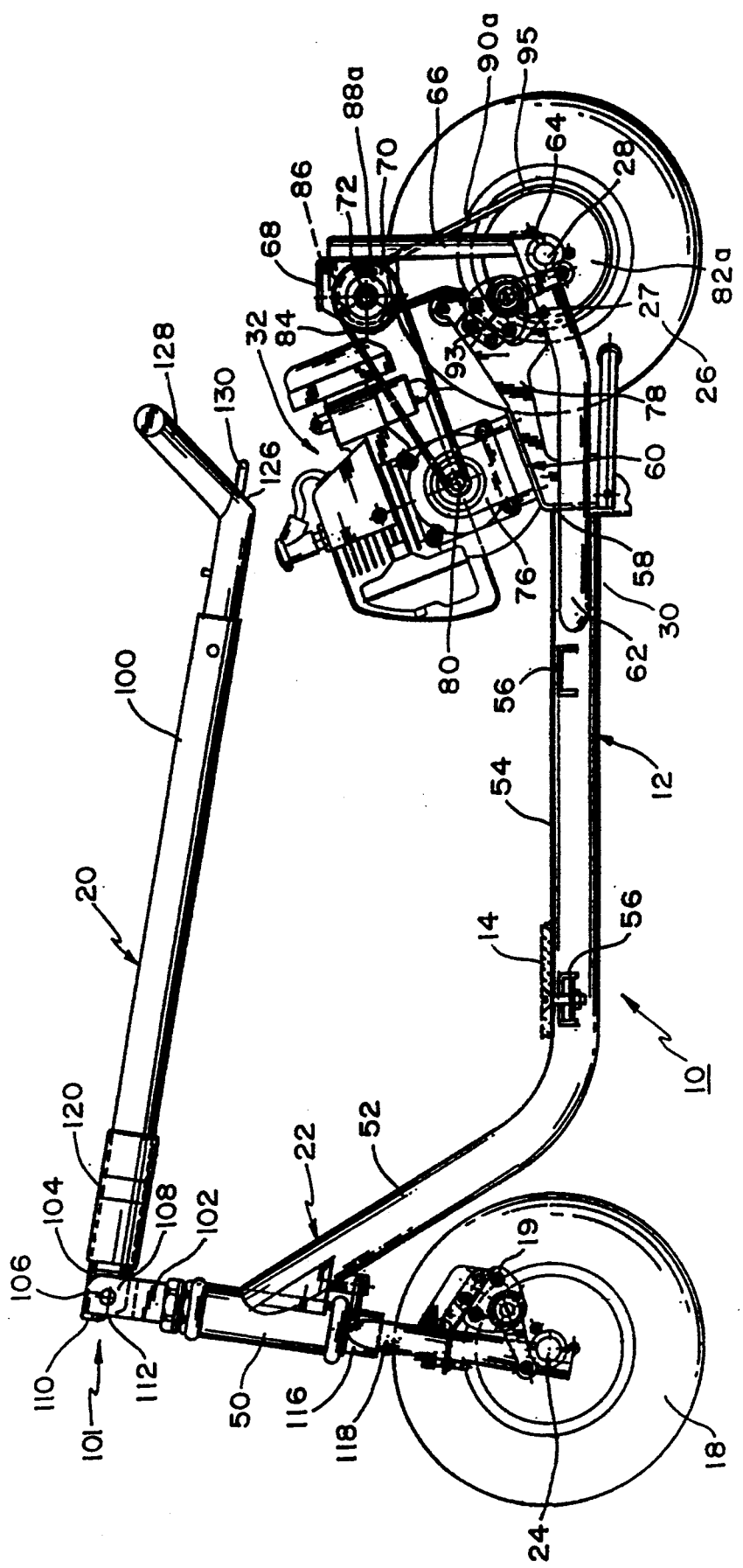
FIG. 9 is a left side view of the motorized scooter with the steering member in the folded position as is shown in FIG. 5 showing an alternative final drive arrangement.

An alternative motorized scooter is illustrated in FIG. 9. This alternative is identical to that described above except that the final drive chain 90a and sprocket 82a are arranged on the left side of the rear wheel 26. Thus there is no actual crossing over of the drive train from the left to the fight side of the rear wheel 26. The horizontal drive transfer support plate 68 and upright support struts 66 remain necessary to support the speed reducing assembly including primary and secondary transfer sprockets 86 and 88a respectively. These sprockets remain necessary to provide the required gear reduction required to match motor and final drive speeds. The sprocketed end 80 of the motor drive shaft, the primary chain 84, the primary transfer sprocket 86, the secondary transfer sprocket 88a and the final drive sprocket 82a and chain 90a are generally aligned and clustered together. In this alternative embodiment, the disk brake assembly 27, comprising caliper 93 and rotor 95, may remain on the left side of the wheel 26 as is shown in FIG. 9, or may be mounted on the fight side of the wheel 26.

While only one preferred embodiment of this invention and one alternative have been described above, it is to be understood that many embodiments thereof are possible without departing from the principles of this invention as defined in the claims which follow. For example, the drive transfer device may utilize pulleys and belts instead of sprockets and chains. These are considered to be equivalents, although the sprocket and chain arrangement is preferred. All patents, patent applications, and publications referred to herein are hereby incorporated by reference in their entirety.

What is claimed is:

1. A collapsible, light W..eight and portable motorized vehicle having a free wheeling front wheel and a motor driven rear wheel, comprising: a generally singular tubular frame, for supporting a deck having a generally horizontal portion fixedly secured to at least two deck support plates mounted on said frame for enabling a rider to stand on said deck between the front and rear wheels, said front and rear wheels including mounted tires and disc brakes assemblies, a foldable steering assembly comprising a front fork rotatably supporting said front wheel for rotation about an axis, a fork stem extending upward from said front fork through a head portion of said frame, a steedring member having a stem portion fixed to said fork stem for rotation of said steering member about a first axis when in an operating position, and a shaft portion having one end rotatably attached to said stem portion for about a 90 degree rotation of said shaft portion about a second axis normal to said first axis, said steering member further comprising a. tubular column slidably disposed over said one end of said shaft portion movable between a locked position whereby said column is disposed over said one end locking said shaft portion and said stem portion together to prevent rotation of said shaft portion about said second axis and an Unlocked position, said collar having at least one internal circumferential groove therein and said shaft portion having a spring loaded ball disposed in a blind bore in said shaft portion, and said ball engaging said groove for preventing during use of said vehicle any unintentional movement or undesired release of said collar from said locked position over said one end; and wherein said shaft portion having a retractable locking pin member axially extending from an opposite end of said shaft portion for engaging a mating aperture in said deck when said shaft port,ion is rotated to a folded down storage and transport position and said shaft portion adapted to be latched to said deck to lock said steering member in the storage and transport position; whereby said vehicle can be hand carried and transported by gripping said folded down shaft portion of said steering member.

2. The vehicle according to claim 1 wherein said retractable locking pin member is slidably disposed in said shaft portion and spring biased.

3. The vehicle according to claim 2 wherein said pin member further comprises a handle member attached thereto and extending through an axial slot in said shaft portion.

4. A collapsible light weight and portable motorized two-wheeled vehicle comprising:
   a generally singular tubular frame;
   a deck having a generally horizontal portion fixedly secured to at least two deck support plates mounted on said frame for enabling a rider to stand on said deck between a pair of in line front and rear wheels, said front and rear wheels including pneumatic tires and disc brake assemblies,
   a foldable steering member having a stem portion fixed to a fork rotatably supporting said front wheel for rotation of said steering member and said fork about a first axis, and a shaft portion having one end rotatably attached to said stem portion for about a 90 degree rotation of said shaft portion about a second axis normal to said first axis to and from a folded position, said steering member further comprising a tubular collar slidably disposed over said one end of said shaft portion movable between a locked position locking said shaft portion and said stem portion together to prevent rotation of said shaft portion about said second axis and an unlocked position, said collar having at least one internal circumferential groove therein and said shaft portion having a spring loaded ball detent disposed in a blind bore in said shaft portion, and said ball engaging said groove for preventing during use of said vehicle any unintentional movement or Undesired release of said collar from said locked position over said one end; and
   said shaft portion having a retractable locking pin member extending out of said shaft portion for engaging a cooperatively associated mating aperture in said rear portion of said deck when said shaft portion is rotated about said 90 degrees to said folded position to lock said steering member in a storage and transport position; whereby said vehicle can be hand carried by gripping said foldable steering member.

5. The vehicle according to claim 4 wherein said retractable locking pin member is slidably disposed in said shaft portion.

6. The vehicle according to claim 5 wherein said pin member is spring biased in an extended position out of said shaft portion.

7. The vehicle according to claim 5 wherein said pin member further comprises a handle member attached thereto extending through an axial slot in said shaft portion.

8. The vehicle according to claim 4 further comprising a motor mounted on said frame having a drive shaft having one end extending from said motor forward of said rear wheel in a direction normal to an axis extending between said wheels, said one end of said drive shaft extending to one side of said rear wheel, and a drive transfer device extending from the one end of said drive shaft on said one side of said rear wheel to an opposite side of said rear wheel coupling said drive shaft to said rear wheel on said opposite side.

9. The vehicle according to claim 8 wherein said drive transfer device comprises a plurality of sprocket and chain linkages between said drive shaft and said rear wheel.

10. The vehicle according to claim 4 further comprising a motor mounted on said frame having a drive shaft having one end extending from said motor forward of said rear wheel in a horizontal direction normal to an axis extending between said wheels, said one end of said drive shaft extending to one side of said rear wheel, and a drive transfer device extending from the one end of the drive shaft to said rear wheel.

11. The vehicle according to claim 10 wherein said drive transfer device includes a speed reducing assembly located above said rear wheel.

12. The vehicle according to claim 11 wherein said speed reducing assembly includes a primary transfer sprocket and a secondary transfer sprocket mounted on a common shaft, 13. The vehicle according to claim 12 wherein said drive transfer device includes a primary chain connected between said one end of said drive shaft and said primary transfer sprocket and a final drive chain connected between said secondary transfer sprocket and a final drive sprocket fixed to said rear wheel.

14. The vehicle according to claim 13 wherein said primary transfer sprocket and primary chain are located on one side of said rear wheel and said secondary transfer sprocket and final drive chain are located on an opposite side of said rear wheel.

15. The vehicle according to claim 12 wherein said primary and secondary transfer sprockets are located to one side of said rear wheel on said common shaft.

16. The vehicle according to claim 12 wherein said primary and secondary transfer sprockets are spaced apart on said common shaft and on opposite sides of said rear wheel.

* * * * *